United States Patent
Wachira et al.

(10) Patent No.: US 12,118,495 B2
(45) Date of Patent: Oct. 15, 2024

(54) DYNAMICALLY MODIFYING A PLATFORM BASED ON USER FEEDBACK

(71) Applicant: International Business Machines Corporation, Armonk, NY (US)

(72) Inventors: Charles Muchiri Wachira, Karatina (KE); Girmaw Abebe Tadesse, Nairobi (KE); Celia Cintas, Nairobi (KE); Sekou Lionel Remy, Nairobi (KE); Aisha Walcott, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 17/223,068

(22) Filed: Apr. 6, 2021

(65) Prior Publication Data
US 2022/0318702 A1    Oct. 6, 2022

(51) Int. Cl.
G06Q 10/06        (2023.01)
G06Q 10/0637    (2023.01)
G06Q 30/016      (2023.01)

(52) U.S. Cl.
CPC ....... G06Q 10/0637 (2013.01); G06Q 30/016 (2013.01)

(58) Field of Classification Search
None
See application file for complete search history.

(56) References Cited

U.S. PATENT DOCUMENTS

| | | | | |
|---|---|---|---|---|
| 5,586,252 A | * | 12/1996 | Barnard | G06F 11/2273 |
| | | | | 714/48 |
| 6,909,994 B2 | * | 6/2005 | Johnson | G05B 23/0278 |
| | | | | 714/25 |
| 8,996,639 B1 | * | 3/2015 | Faaborg | H04L 51/02 |
| | | | | 455/412.2 |

(Continued)

FOREIGN PATENT DOCUMENTS

CN    106066791 A    11/2016
WO    WO-2021221807 A1 *  11/2021  ............... G06F 8/33

OTHER PUBLICATIONS

English translation of WO2021221807A1 (Year: 2020).*

(Continued)

*Primary Examiner* — Jerry O'Connor
*Assistant Examiner* — Jeremy L Gunn
(74) *Attorney, Agent, or Firm* — Joseph P. Curcuru

(57) ABSTRACT

In an approach to improve platform modification by dynamically modifying content based on user feedback. Embodiments suggest one or more solutions and recommendations, via a user interface, to one or more users that comply with one or more standards, regulations, and resources of an organization. Further, embodiments verify the solutions and recommendations that comply with the one or more standards, regulations, and resources of the organization, and automatically generate a prototype solution. Additionally, embodiments provide, by the user interface, one or more augmented solutions for the one or more users, wherein augmented solutions are provided to the one or more users (Continued)

requiring a temporary solution; and label and cluster user feedback and associated solutions of the one or more users to provide effective solutions for future users based on a similarity of the feedback of the one or more users.

20 Claims, 4 Drawing Sheets

(56) References Cited

U.S. PATENT DOCUMENTS

| | | | |
|---|---|---|---|
| 9,632,771 | B2 | 4/2017 | Toub |
| 10,026,279 | B1* | 7/2018 | Beller .................... G08B 25/10 |
| 10,101,870 | B2 | 10/2018 | Ali |
| 2005/0204340 | A1 | 9/2005 | Ruminer |
| 2006/0236301 | A1 | 10/2006 | Minium |
| 2007/0006152 | A1 | 1/2007 | Ahmed |
| 2013/0117267 | A1* | 5/2013 | Buryak .................... G06F 16/93 |
| | | | 707/737 |
| 2015/0134389 | A1* | 5/2015 | Punera .................... G06N 5/00 |
| | | | 705/7.15 |
| 2015/0134543 | A1* | 5/2015 | Ivanic .................... G06N 20/00 |
| | | | 705/300 |
| 2016/0350090 | A1* | 12/2016 | Kawaguchi ........... G06F 8/4441 |
| 2018/0213284 | A1* | 7/2018 | Shekhar ............ H04N 21/4532 |
| 2020/0372516 | A1 | 11/2020 | Wolf |

OTHER PUBLICATIONS

A. Alnusair, T. Zhao and E. Bodden, "Effective API navigation and reuse," 2010 IEEE International Conference on Information Reuse & Integration, Las Vegas, NV, USA, 2010, pp. 7-12, doi: 10.1109/IRI.2010.5558972: (Year: 2010).*

Galvis et al., "Analysis of User Comments: An Approach for Software Requirements Evolution", copyright 2013 IEEE, <https://ieeexplore.ieee.org/document/6606604>, 10 pages.

Palomba et al., "Recommending and Localizing Change Requests for Mobile Apps Based on User Reviews", 2017 IEEE/ACM 39th International Conference on Software Engineering, <https://ieeexplore.ieee.org/document/7985654>, © 2017 IEEE, 12 pages.

* cited by examiner

DYNAMICALLY MODIFYING A PLATFORM BASED ON USER FEEDBACK

BACKGROUND OF THE INVENTION

The present invention relates generally to the field of platform modification, and more particularly to dynamically modifying the content of an application.

User feedback is any information that a customer/user provides regarding how a product or service performs and/or operates. User feedback usually consists of a user's level of satisfaction with a product and/or service and what satisfies or dissatisfies said user about the product and/or service. Explicit feedback is obtained from assessors of relevance indicating the relevance of a document retrieved for a query. Explicit feedback is defined as explicit only when the assessors (or other users of a system) know that the feedback provided is interpreted as relevance judgments. Users may indicate relevance explicitly using a binary or graded relevance system. Binary relevance feedback may indicate that a document is either relevant or irrelevant for a given query. Graded relevance feedback indicates the relevance of a document to a query on a scale using numbers, letters, or descriptions (such as "not relevant", "somewhat relevant", "relevant", or "very relevant").

SUMMARY

Embodiments of the present invention disclose a computer-implemented method, a computer program product, and a system for dynamically modifying the content of a platform based on user feedback, the computer-implemented method comprising: suggesting one or more solutions and recommendations, via a user interface, to one or more users that comply with one or more standards, regulations, and resources of an organization; verifying the solutions and recommendations that comply with the one or more standards, regulations, and resources of the organization; automatically generating a prototype solution, wherein the prototype solution is validated by the one or more user iteratively until a consensus is achieved; providing, by the user interface, one or more augmented solutions for the one or more users, wherein augmented solutions are provided to the one or more users requiring a temporary solution; and labeling and clustering user feedback and associated solutions of the one or more users to provide effective solutions for future users based on a similarity of the feedback of the one or more users.

DETAILED DESCRIPTION

Figure 1:
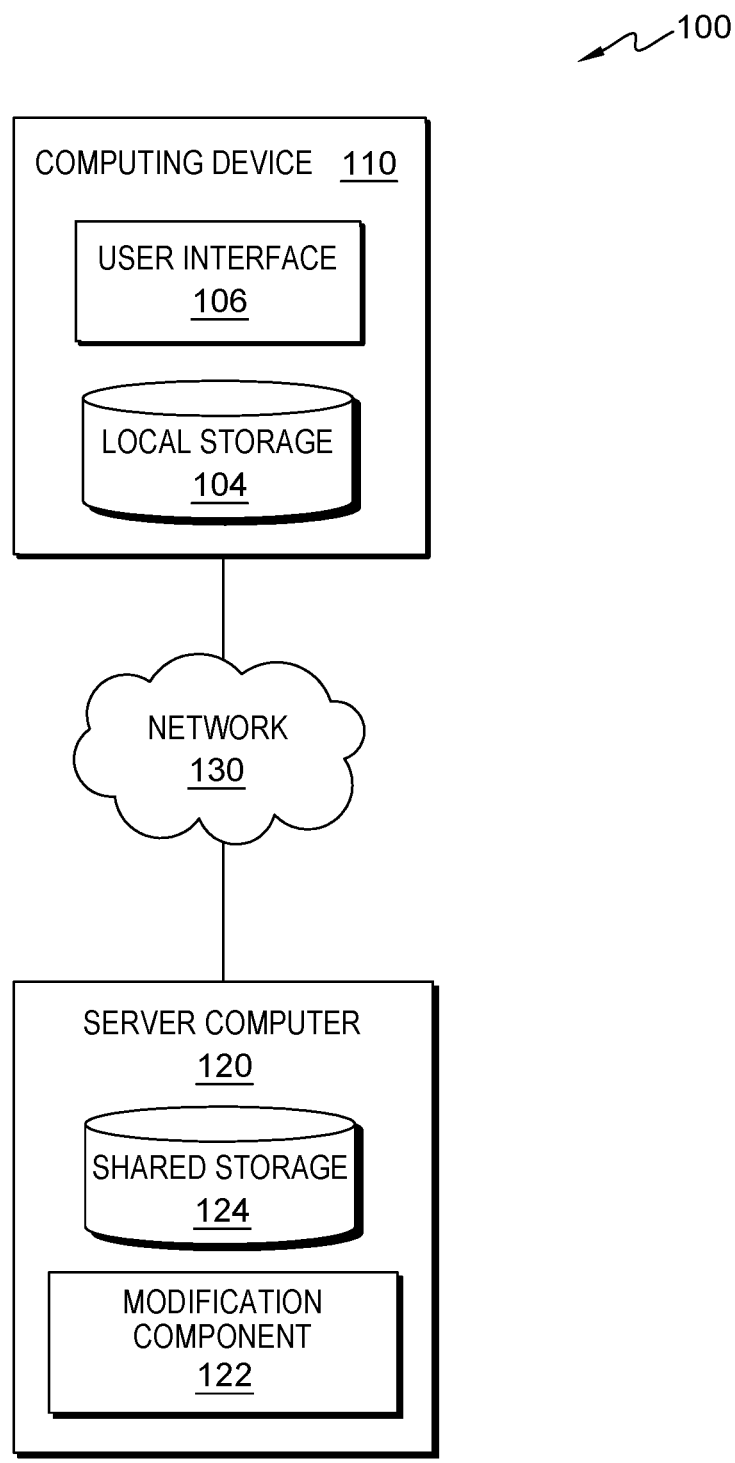
FIG. 1 is a functional block diagram illustrating a distributed data processing environment, in accordance with an embodiment of the present invention.

Embodiments of the present invention recognize that in most cases, system designers and developers provide a means for a system user to provide feedback and suggest improvements to a system. Embodiments of the present invention recognize that this process ensures that the system is relevant and evolves to meet the users' dynamic requirements. Embodiments of the present invention recognize that in most cases, users are not able to express the requirements in a brief and concise manner that system developers would appreciate (e.g., actionable list of tasks). Embodiments of the present invention recognize that user feedback is sometimes expressed in a verbose manner, which may delay the actioning of such feedback and may altogether be forgotten.

Embodiments of the present invention recognize that for a large or intensive project, it is not trivial to prioritize feedback and match the right personnel with the right compute for actioning on users' feedback. Further, embodiments of the present invention recognize that the process of identifying the required dependencies to implement user feedback can be time consuming especially if the organization provides some requirements for candidate dependencies to be compliant of, and it also depends on the developer who sometimes may miss cutting edge libraries that would efficiently implement a functionality.

Embodiments of the present invention recognize that a common strategy to address user feedback manually results in a significant cost in analyzing user feedback. Embodiments of the present invention recognize that assigning the right personnel and expecting to build the solution from scratch and importantly a delay in fulfilling users' requirements results in the minimizing of business achievements (e.g., profits). Moreover, embodiments of the present invention recognize that existing feedback interfaces provide limited flexibility for users to provide their feedbacks, often in texts.

Embodiments of the present invention recognize that there are existing solutions for the routing and tagging of written issues to a particular set of users in a company/organization, and association of codebase with business rules. However, embodiments of the present invention recognize that the current art fails to enable: (i) flexibility in feedback interfaces; (ii) automated solutions/recommendations that comply with the organization's resources and standards; (iii) addressing conflicting or subjective requirements from users (iv) clustering of users based on their feedbacks to transfer suggested solutions to users with limited feedback profile; (v) and automated linkages of requests, suggested solutions and personnel and recommendations of references.

Embodiments of the present invention improve the art by dynamically modifying the content of an application or a platform per user feedback. Embodiments of the present invention comprise a feedback interface with plurality of data sources (text, audio and graphics); suggesting and verifying solutions/recommendations that comply with an organization's (e.g., a user's) resources and standards and/or regulations; generating a prototype/mock solution to be validated by the user iteratively until consensus is achieved; providing augmented solution for users with conflicting requests; and labelling and clustering of users' feedbacks and their associated solutions to provide effective solutions for future users based on their similarity with previous feedback. For example, if two users provide conflicting feedback based on personal preferences, the system will provide each of the two users with what they want by varying the base version of the system to suit each users' preferences. A user's preferences may be customizable and tailored by each user. The augmentation here entails that the system will extend the base version to suit the preference of a certain user, while another user with a different preference will be presented with a different version. The augmentation of base version of the system is based on user provided feedback, and the clustering of the users and the users feedback based on user similarity, wherein a user who doesn't give feedback can be categorized to a certain cluster and be provided with a certain augmentation of the system.

Embodiments of the present invention improve the art by suggesting and verifying solutions/recommendations for a particular user's feedback/request that comply with the organization's standards and/or regulations in addition to suggesting solutions by continuously learning the suggested solutions/recommendations based on the interaction with the developers and how the developers solve problems. Additionally, embodiments of the present invention improve the art by generating a prototype/mock solution based on user's feedback for its validation and further iterations by sharing it with the user and the developer until consensus is achieved. Further, embodiments of the present invention improve the art by labelling and clustering of users' feedbacks, and temporal solutions (solutions that doesn't require core modifications of the system) would be augmented on the existing system that could be used for future users based on their similarity with previous feedbacks.

Implementation of embodiments of the invention may take a variety of forms, and exemplary implementation details are discussed subsequently with reference to the Figures (i.e., FIG. 1-FIG. 4).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to the modification component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 3. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130.

In various embodiment of the present invention, component 122 dynamically modifies the content of an application or a platform based on one or more user feedback. In various embodiment of the present invention, component 122 suggests and verifies solutions/recommendations that comply with an organization's resources and standards and/or regulations. In various embodiment of the present invention, component 122 automatically generates of a prototype/mock solution to be validated by the user iteratively until a consensus is achieved. In various embodiment of the present invention, component 122 provides an augmented solution for users, wherein augmented solutions are provided to the users with conflicting requests, wherein augmented solutions are provided to the users with accessibility requirements (e.g., color blindness), and wherein augmented solutions are provided to one or more users requesting a temporary solution. In various embodiment of the present invention, component 122 labels and clusters user feedback and user associated solutions to provide effective solutions for future users based on user similarity with previous feedbacks.

In various embodiment of the present invention, component 122 incorporates user (e.g., business) guidelines into the context, wherein the retrieved metadata is text based. Context is defined by the spatial and semantic details extracted from the user's textual feedback. In various embodiment of the present invention, component 122 focuses on association of tasks with code and doesn't propose requirements/libraries options according to a given organization policy. In some present invention, component 122 integrates business rules, wherein no feedback from users or other developers are included in the modifications of the code. In some embodiments of the present invention, component 122 references on how the tagging or identification of source code is done.

Figure 2:
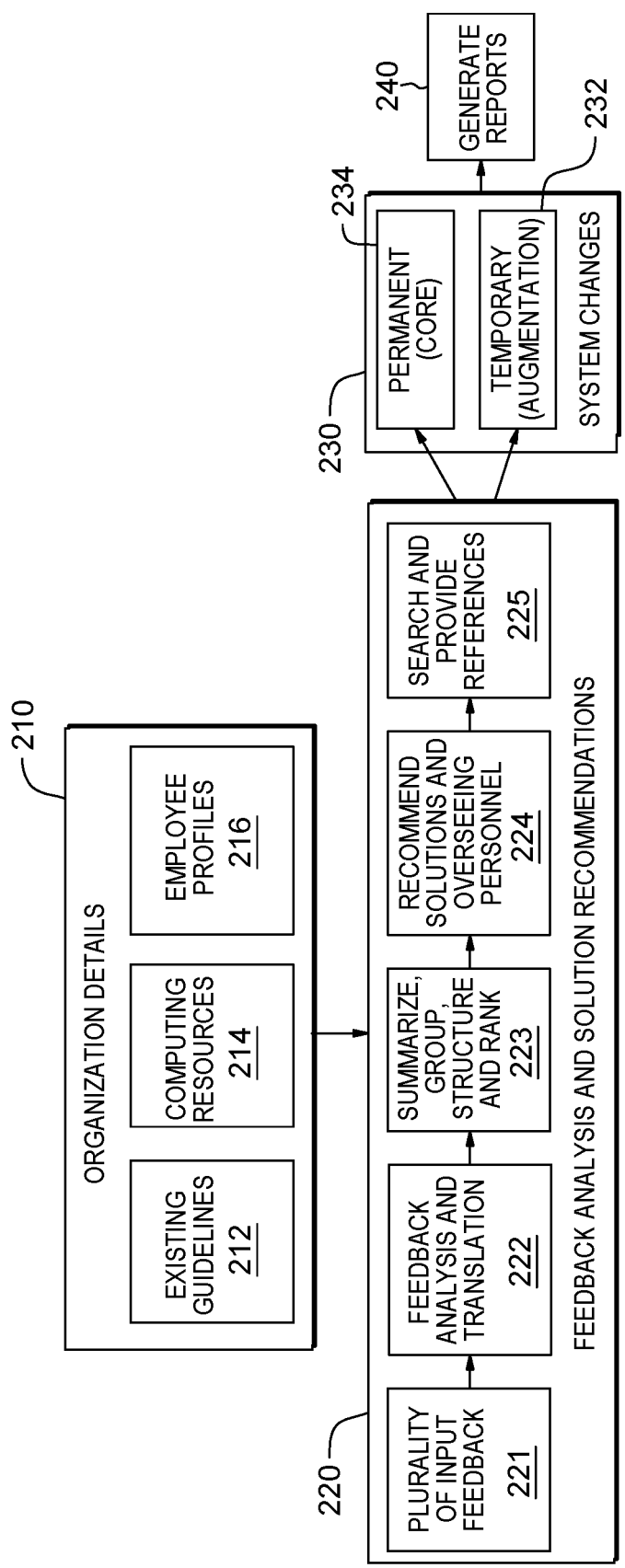
FIG. 2 illustrates dataflow of a modification component, on a server computer within the distributed data processing environment of FIG. 1, for dynamically modifying the content of an application or a platform based on user feedback, in accordance with an embodiment of the present invention.

FIG. 2 illustrates dataflow of component 122, generally designated 200, in communication with server computer 120 and/or computing device 110, within distributed data processing environment 100 of FIG. 1, for dynamically modifying the content of an application or a platform based on user feedback, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, FIG. 2 comprises feedback analysis and solution recommendation component 220, organization details component 210, system changes component 230, and generate report generation module 240. In the depicted embodiment, feedback module 221 comprises a feedback interface with a plurality of data sources (text, audio and graphics). In the depicted embodiment, domain-specific analysis module 222 analyzes received feedback using domain-specific machine learning algorithms (e.g., NLP for text and speech processing for voice and computer vision for graphics) and integrates feedback information provided across different domains using fusion techniques. Domain-specific analysis module 222 may also execute feedback analysis and translation. In the depicted embodiment, summarizing and ranking module 223 clusters and summarizes the received feedback (e.g., user feedback) into a structured format; ranking the received feedback. In the depicted embodiment, recommendation module 224 recommends potential solutions (e.g., code snippets) and libraries for top-ranked user feedback output from summarizing and ranking module 223, utilizing existing guidelines and resources of the organization; matching the development of the solutions to the corresponding employees by analyzing their skill sets and complexity of the solution.

In the depicted embodiment organization details component 210 comprises existing guidelines 212, computing resources 214, and employees' profiles 216. In the depicted embodiment, recommendation module 224 receives organization data from organization details component 210, via existing guidelines 212, computing resources 214, and employees' profiles 216. Organization data may comprise, but is not limited to, existing organization guidelines, collected, retrieved, and/or stored computing resources, and both new and historic employee profiles. In various embodiments of the present invention, recommendation module 224 recommends solutions and overseeing personnel based on the received organization data. In the depicted embodiment, referencing module 225 provides appropriate references and resources for the recommended solutions. Further, in various embodiments of the present invention, system changes module 230 receives data from feedback analysis and solution recommendation component 220. In the depicted embodiment, augmentation module 232 provides augmented versions of the platform as per the feedbacks when the core modification is not necessary. In various embodiments of the present invention, augmentation module 232 provides temporary augmented versions of the platforms. In the depicted embodiment, core modification module 234 modifies system changes module 230, resulting in an upgrade of the previous version. In the depicted embodiment, report generation module 240 generates a report that describes the feedback, solutions and one or more corresponding employees. In various embodiments of the present invention, the generated report is output and provided to one or more system developers or administrators, via interface 106, to ensure the modifications done by the system (i.e., component 122) are verified by them. If for example the system administrators find that the modifications done are not desirable (e.g., not workable), the modifications can be overridden, wherein desirable modifications are features or functions that are predetermined and/or compatible or easily integrated into the computer-based application. Desirable modifications may be predetermined desired features or functions as they are known and understood in the art. In addition, in various embodiments of the present invention, the reports form a labelled dataset that is used to do similarity analysis on users so as to offer augmented solutions to users within the same category.

For example, in the event of multiple users, one or more programmers submit issues and pull requests (PR) to control the version platforms of code. User X then submits a PR that fixes a given issue. In this example, component 122 detects that user X used a non-compliant DB service for organization Q. The platform detects the inconsistency (e.g., non-compliant DB service) and adapts the existing code to a compliant DB. After automatic tests that the code maintains the original purpose and integrates with the component 122, a new automatic PR is generated. In this example, both organization Q and user X can revise and approve the proposed solution. In other case, user X can submit a new requirement via an Issue, the system will tag the type of modification that is required and automatically generate a mock of the proposed new feature for the user to review.

Figure 3:
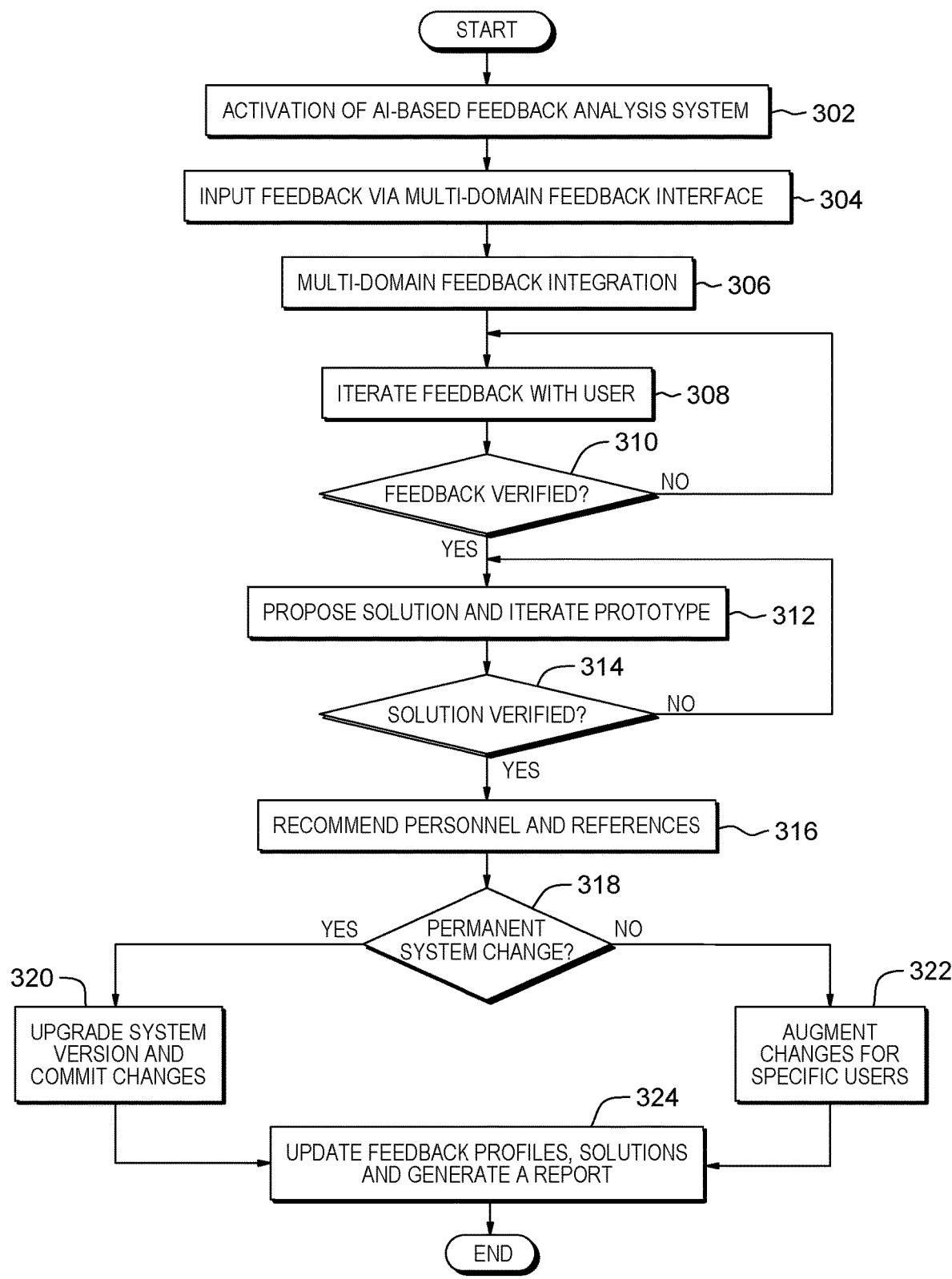
FIG. 3 illustrates operational steps of the modification component, on a server computer within the distributed data processing environment of FIG. 1, for dynamically modifying the content of an application or a platform per user feedback, in accordance with an embodiment of the present invention.

FIG. 3 illustrates operational steps of component 122, generally designated 300, in communication with server computer 120 and/or computing device 110, within distributed data processing environment 100 of FIG. 1, for dynamically modifying the content of an application or a platform based on user feedback, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 activates a feedback analysis system. In various embodiments of the present invention, component 122 activates an AI-based feedback analysis system.

In step 304, component 122 inputs feedback via multi-domain feedback interfaces. In various embodiments of the present invention, component 122 inputs one or more received user and/or organization feedback from multi-domain feedback interfaces (e.g., interface 106).

In step 306, component 122 integrates multi-domain feedback. In various embodiments of the present invention, component 122 integrates a plurality of multi-domain feedback. In various embodiments of the present invention, component 122 issues responsive display prompts that prompt a user to respond to a predetermined generated display prompt associated with the iterated feedback that is responsive to a user's response.

In step 308, component 122 iterates feedback with user. In various embodiments of the present invention, component 122 iterates a plurality of feedback with a user on computing device 110, wherein the user interacts with the iterated feedback.

In step 310, component 122 determines if the feedback is verified. In various embodiments of the present invention, component 122 determines if one or more iterated feedback is verified. In the depicted embodiment, if component 122 determines the iterated feedback is not verified (No step) then component 122 repeats step 208. In the depicted embodiment, if component 122 determines the iterated feedback is verified (Yes step) then component 122 advances to step 312. In various embodiments of the present invention, component 122 issues responsive display prompts that prompt a user to respond to a predetermined generated display prompt associated with determining if the feedback is verified and that is responsive to a user's response.

In step 312, component 122 purposes a solution and iterates a prototype. In various embodiments of the present invention, component 122 generates one or more prototype/mock solution and proposes the one or more prototype/mock solution to be validated by the user iteratively until consensus is achieved, providing one or more augmented solutions for users with conflicting requests.

In step 314, 122 determines if the proposed solution is verified. In various embodiments of the present invention, component 122 determines if the proposed one or more prototype/mock solutions are validated by one or more users iteratively until consensus is achieved. In the depicted embodiment, if component 122 determines the proposed one or more solutions is not verified by one or more users (No step) then component 122 repeats step 312. In the depicted embodiment, if component 122 determines the proposed one or more solutions are verified by one or more users (Yes step) then component 122 advances to step 316.

In step 316, component 122 recommends the solution to predetermined personnel. In various embodiments of the present invention, component 122 recommends one or more validated solutions to one or more predetermined personnel. In various embodiments of the present invention, component 122 analyzes the skills and previous experience of employees to identify one or more personnel to recommend the suggested validated solution to. In various embodiments of the present invention, component 122 parses, analyses, and digests online resources to provide code snippets and corresponding references to begin to implement the one or more verified solutions. Online resources comprise but are not limited to internet sources (e.g., package management websites) where component 122 searches for exemplary packages to implement a desired functionality or component 122 can be used to search for exemplary approaches to address identified and analyzed feedback.

In step 318, component 122 determines if the system change is permanent. In various embodiments of the present invention, component 122 determines if the one or more references and verified solutions recommended to one or more personnel will permanently change the system based on the provide code snippets and corresponding references to. In various embodiments of the present invention, component 122 checks whether there is a consensus in a certain change (i.e., is there any conflicting feedback from users on a certain change?) if not, the change becomes a candidate for permanent system change upon review by the system administrator/developers through the generated reports. Certain changes may be predetermined or defined by a user or system administrator/developers.

In the depicted embodiment, if component 122 determines the one or more references and verified solutions recommended to one or more personnel will permanently change the system (Yes step) then component 122 advances to step 320. In the depicted embodiment, if component 122 determines the one or more references and verified solutions recommended to one or more personnel will not permanently change the system (No step) then component 122 advances to step 322.

In step 320, component 122 upgrades the system version and commits the changes. In various embodiments of the present invention, component 122 upgrades the system version and commits the one or more permanent changes to the system.

In step 322, component 122 augments changes to one or more specific user profiles. In various embodiments of the present invention, component 122 augments changes for one or more specific user profiles based on the upgrades to the system, wherein the specific users are predetermined.

In step 324, component 122 updates the feedback profiles. In various embodiments of the present invention, component 122 updates the feedback profiles of one or more users. In various embodiments of the present invention, component 122 updates and stores one or more recommended and/or verified solutions based on the implemented system changes. In various embodiments of the present invention, component 122 generates a report based on the updated feedback profiles, solutions, implemented system changes. The generated report comprises: information associated with the raw user feedback, the analysis of the feedback and the identified themes and tasks, the recommended packages and changes done to address the tasks by the system, and the resulting outcome of the change that the user is presented with, including the communication between the user and the system until consensus is reached on a desired change to the system. Raw user feedback is feedback received directly from a user that is unaltered or processed.

The generated report is output and displayed, via interface 106, to one or more system developers or administrators to ensure that the modifications done by the system are verified. If for example the system administrators find that the modifications done are not desirable, the modifications may be overridden. In some embodiments of the present invention, component 122 generates and displays responsive prompts, via interface 106, to one or more users (i.e., one or more system developers or administrators) prompting to confirm or cancel the proposed modifications, wherein responsive to receiving confirmation, via the displayed responsive prompt, accepts the modifications and system changes and, wherein responsive to receiving a cancellation notice, via the displayed responsive prompt, overrides the modifications and system changes.

Figure 4:
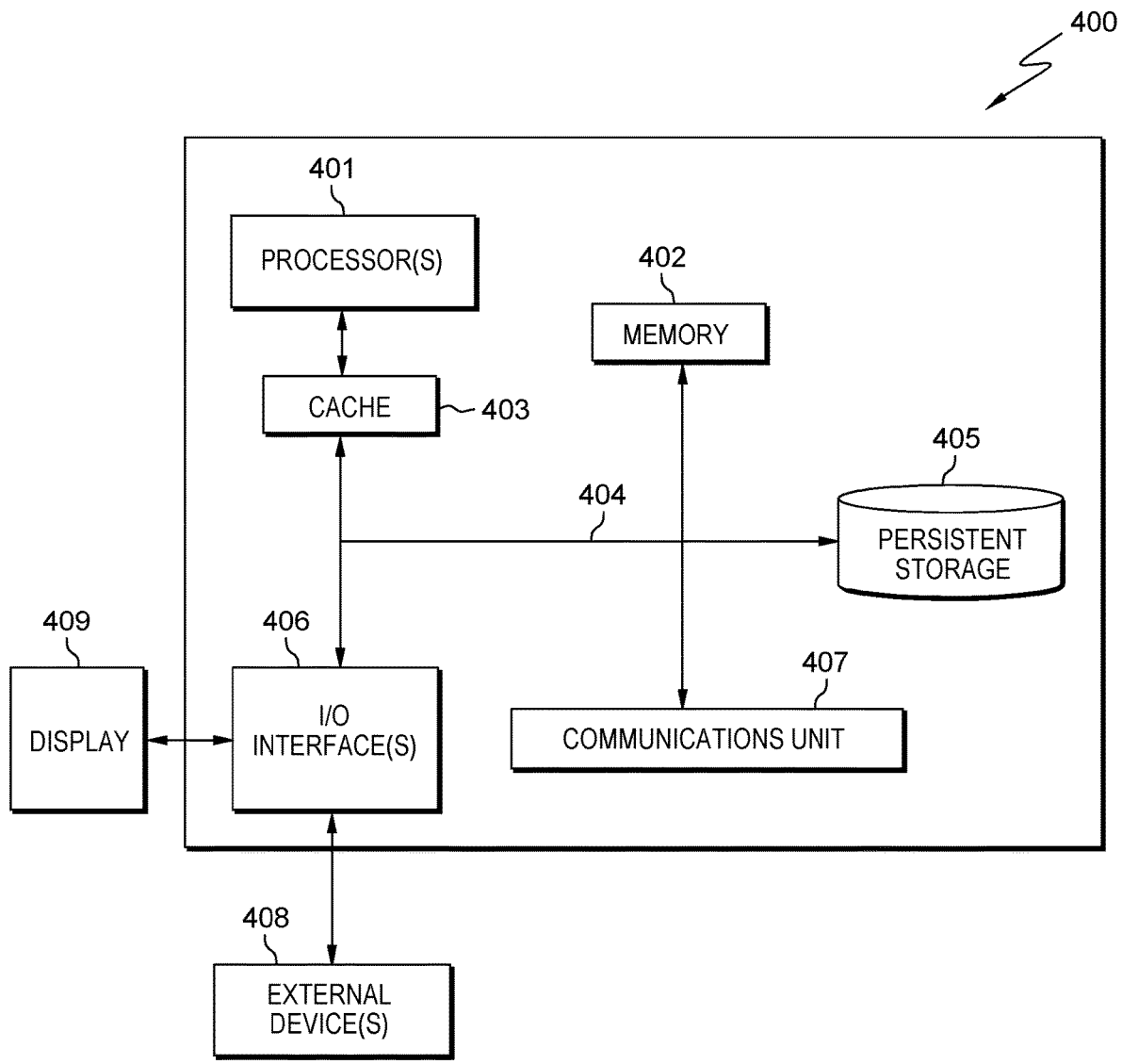
FIG. 4 depicts a block diagram of components of the server computer executing the modification component within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where server computing 120 represents an example of computer system 400 that includes component 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamically modifying a platform, the computer-implemented method comprising:
    suggesting one or more solutions and libraries of ranked user feedback from a summarizing and ranking module based on the user feedback, via a user interface, to one or more users, wherein the one or more solutions are a code snippet;
    verifying the solutions and recommendations that comply with a standard, regulation, and resource of an organization;
    generating a prototype solution based at least on the verified recommendations, wherein the prototype solution comprises a code snippet;
    outputting the prototype solution to be validated by the one or more users iteratively until consensus is achieved;
    responsive to determining the prototype solution is validated, temporaily displaying, by the user interface, one or more augmented displays of the code snippet to the one or more user, wherein the augmented display of the prototype solution comprises a new or a supplemental code being augmented over an existing source code;
    responsive to determining the prototype solution will be a permanent system change, incorporating the protype solution with the existing source code to create an upgraded version of code;
    detecting a non-compliant database service for an organization being used;
    detecting by the platform a non-compliant database service;
    adapting the upgraded version of code to a compliant database based on the prototype solution;
    automatically testing the upgraded version of code to ensure the existing code maintains an original purpose; and
    integrating the code snippet with the upgraded version of code.

2. The computer-implemented method of claim 1, wherein the augmented solutions are provided, and wherein the one or more users have conflicting requests.

3. The computer-implemented method of claim 1, wherein augmented solutions are provided to the one or more users with accessibility requirements.

4. The computer-implemented method of claim 1, further comprising:
    updating one or more feedback profiles of the one or more users; and
    storing one or more recommended and verified solutions based on one or more implemented system changes.

5. The computer-implemented method of claim 1, further comprising:
    generating a report based on updated feedback profiles, solutions, and implemented system changes.

6. The computer-implemented method of claim 5, further comprising:
    outputting, by the user interface, the generated report to the one or more users to ensure that modifications done by the system have been verified, wherein the modifications are overridden if the modifications are not workable.

7. The computer-implemented method of claim 6, further comprising:
    generating one or more responsive prompts; and
    displaying, by the user interface, the one or more responsive prompts to the one or more users prompting the one or more users to confirm or cancel the modifications, wherein responsive to receiving a confirmation, via the displayed one or more responsive prompts, accepting the modifications, and system changes and, wherein responsive to receiving a cancellation notice, via the displayed responsive prompt, overriding the modifications and implemented system changes.

8. A computer system for dynamically modifying a platform, the computer system comprising:
    one or more computer processors;
    one or more computer readable storage devices;
    program instructions stored on the one or more computer readable storage devices for execution by at least one of the one or more computer processors, the stored program instructions comprising:
        program instructions to suggest one or more solutions and libraries of ranked user feedback from a summarizing and ranking module based on the user feedback, via a user interface, to one or more users, wherein the one or more solutions are a code snippet;
        program instructions to verify the solutions and recommendations that comply with a standard, regulation, and resource of an organization;
        program instructions to generate a prototype solution based at least on the verified recommendations, wherein the prototype solution comprises a code snippet;
        program instructions to output the prototype solution to be validated by the one or more users iteratively until consensus is achieved;
        responsive to determining the prototype solution is validated, program instructions to temporaily displaying, by the user interface, one or more augmented displays of the code snippet to the one or more user, wherein the augmented display of the prototype solution comprises a new or a supplemental code being augmented over an existing source code;
        responsive to determining the prototype solution will be a permanent system change, program instructions to incorporating the protype solution with the existing source code to create an upgraded version of code;
        program instructions to detect a non-compliant database service for an organization being used;
        program instructions to detect by the platform a non-compliant database service;
        program instructions to adapt the upgraded version of code to a compliant database based on the prototype solution;

program instructions to automatically test the upgraded version of code to ensure the existing code maintains an original purpose; and program instructions to integrate the code snippet with the upgraded version of code.

9. The computer system of claim 8, wherein the augmented solutions are provided, and wherein the one or more users have conflicting requests.

10. The computer system of claim 8, wherein augmented solutions are provided to the one or more users with accessibility requirements.

11. The computer system of claim 8, further comprising:
program instructions to update one or more feedback profiles of the one or more users; and
program instructions to store one or more recommended and verified solutions based on one or more implemented system changes.

12. The computer system of claim 8, further comprising:
program instructions to generate a report based on updated feedback profiles, solutions, and implemented system changes.

13. The computer system of claim 12, further comprising:
program instructions to output, by the user interface, the generated report to the one or more users to ensure that modifications done by the system have been verified, wherein the modifications are overridden if the modifications are not workable.

14. The computer system of claim 13, further comprising:
program instructions to generate one or more responsive prompts; and
program instructions to display, by the user interface, the one or more responsive prompts to the one or more users prompting the one or more users to confirm or cancel the modifications, wherein responsive to receiving a confirmation, via the displayed one or more responsive prompts, program instructions to accept the modifications, and system changes and, wherein responsive to receiving a cancellation notice, via the displayed responsive prompt, program instructions to override the modifications and implemented system changes.

15. A computer program product for dynamically modifying a platform, the computer program product comprising:
one or more computer readable storage devices and program instructions stored on the one or more computer readable storage devices, the stored program instructions comprising:
program instructions to suggest one or more solutions and libraries of ranked user feedback from a summarizing and ranking module based on the user feedback, via a user interface, to one or more users, wherein the one or more solutions are a code snippet;
program instructions to verify the solutions and recommendations that comply with a standard, regulation, and resource of an organization;
program instructions to generate a prototype solution based at least on the verified recommendations, wherein the prototype solution comprises a code snippet;
program instructions to output the prototype solution to be validated by the one or more users iteratively until consensus is achieved;
responsive to determining the prototype solution is validated, program instructions to temporarily displaying, by the user interface, one or more augmented displays of the code snippet to the one or more user, wherein the augmented display of the prototype solution comprises a new or a supplemental code being augmented over an existing source code;
responsive to determining the prototype solution will be a permanent system change, program instructions to incorporating the protype solution with the existing source code to create an upgraded version of code;
program instructions to detect a non-compliant database service for an organization being used;
program instructions to detect by the platform a non-compliant database service;
program instructions to adapt the upgraded version of code to a compliant database based on the prototype solution;
program instructions to automatically test the upgraded version of code to ensure the existing code maintains an original purpose; and
program instructions to integrate the code snippet with the upgraded version of code.

16. The computer program product of claim 15, wherein the augmented solutions are provided, and wherein the one or more users have conflicting requests.

17. The computer program product of claim 15, wherein augmented solutions are provided to the one or more users with accessibility requirements.

18. The computer program product of claim 15, further comprising:
program instructions to update one or more feedback profiles of the one or more users; and
program instructions to store one or more recommended and verified solutions based on one or more implemented system changes.

19. The computer program product of claim 15, further comprising:
program instructions to generate a report based on updated feedback profiles, solutions, and implemented system changes; and
program instructions to output, by the user interface, the generated report to the one or more users to ensure that modifications done by the system have been verified, wherein the modifications are overridden if the modifications are not workable.

20. The computer program product of claim 19, further comprising:
program instructions to generate one or more responsive prompts; and
program instructions to display, by the user interface, the one or more responsive prompts to the one or more users prompting the one or more users to confirm or cancel the modifications, wherein responsive to receiving a confirmation, via the displayed one or more responsive prompts, program instructions to accept the modifications, and system changes and, wherein responsive to receiving a cancellation notice, via the displayed responsive prompt, program instructions to override the modifications and implemented system changes.

\* \* \* \* \*